June 5, 1928.

C. M. HOLLEY

CHECK VALVE

Filed Sept. 18, 1922

1,672,127

INVENTOR.
Clarence M. Holley
BY
Charles E. Wiser
ATTORNEY.

Patented June 5, 1928.

1,672,127

UNITED STATES PATENT OFFICE.

CLARENCE M. HOLLEY, OF HIGHLAND PARK, MICHIGAN, ASSIGNOR, BY MESNE ASSIGNMENTS, TO THE HOOVER COMPANY, OF NORTH CANTON, OHIO, A CORPORATION OF OHIO.

CHECK VALVE.

Application filed September 18, 1922. Serial No. 588,788.

This invention relates to check valves and the object of the invention is to provide a check valve which will allow flow of fluid in one direction and prevent flow of fluid in the opposite direction. The principal object of this invention is to provide a check valve which will seat more perfectly than the ball type and thus prevent any possibility of leakage. A further object of the invention is to provide a check valve comprising a thin metal disc adapted to close the line to flow in one direction and adapted to open upon flow through the line in the other direction. Another object of the invention is to provide a thin flexible metal disc which is spring supported to close the inlet conduit, the flow of fluid through the conduit forcing the disc from its seat against the tension of the spring and return flow of fluid in combination with the spring forcing the disc to tight engagement with its seat. Another object of the invention is to provide a check valve which is composed of few parts, is not costly to manufacture, may be easily assembled and will not easily get out of order. These objects and the several novel features of the invention are hereinafter more fully described and claimed and the preferred form of construction by which these objects are attained is shown in the accompanying drawings in which—

Figure 1:
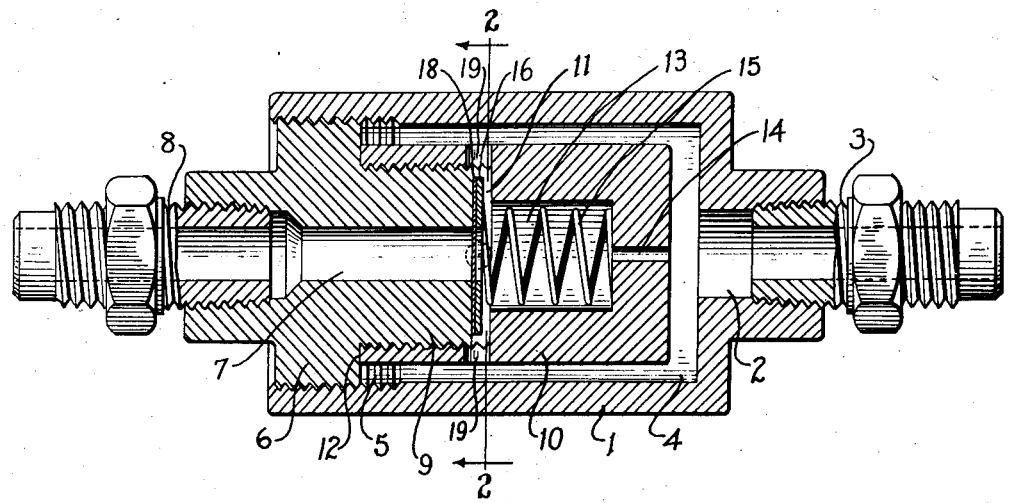
Fig. 1 is a section through a check valve embodying my invention.
Figure 3:
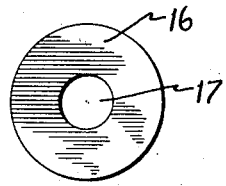
Fig. 3 is a view of the apertured disc for supporting the flexible metal disc.
Figure 2:
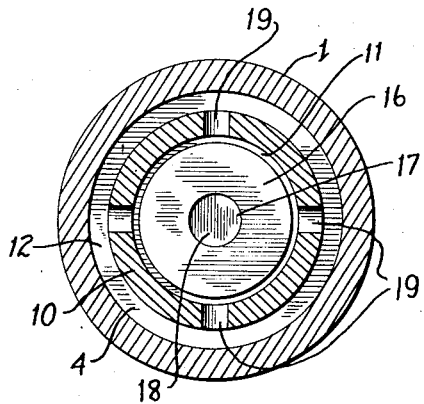
Fig. 2 is a section taken on line 2—2 of Fig. 1.
Figure 4:
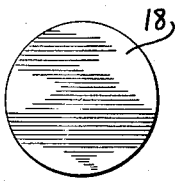
Fig. 4 is a view of the flexible metal disc.

As shown in Fig. 1 a casing 1 is provided having an outlet opening 2 into which a nipple 3 is threaded to which an outlet line is adapted to be connected. The casing 1 is provided with a cylindrical chamber 4 therein which is threaded at 5 to receive a member 6 threaded therein. The member 6 is provided with an inlet conduit 7 and a nipple 8 is threaded into the inlet conduit as shown to which an inlet line is adapted to be connected. The member 6 is provided with an end 9 of smaller diameter which is internally and a member 10 having an internally threaded recess 11 is threaded thereover, the member 10 engaging the shoulder 12 of the member 6 so that a small portion of the chamber 11 remains which opens into a recess 13 in the member 10. The member 10 is also provided with a small aperture 14 allowing communication between the recess 13 and the cylindrical chamber 4. Within the recess 13 is a coiled spring 15 which presses against a washer or disc 16 as shown in Fig. 3 having a central aperture 17 of the same diameter or slightly greater in diameter than the aperture 7 in the member 6. A thin flexible metal disc 18 as shown in Fig. 4 is provided which is of the same diameter as the disc 16 and is held over the inlet aperture 7 of the member 6 by the apertured disc 16 and spring 15 as shown in Fig. 1. The member 10 is provided with a series of apertures 19 which open through the wall thereof into the chamber 11 and provide a means of communication from the chamber 11 to the chamber 4, as shown more particularly in Figs. 1 and 2.

In operation a fluid either air or liquid is passed through the nipple 8 and through the inlet conduit 7 under pressure forcing the disc 18 from its seat against the tension of the spring 15 so that the fluid enters the chamber 11 and passes outwardly through the apertures 19 into the chamber 4. The fluid then passes from the chamber 4 through the outlet 2 and outwardly through the nipple 3. It will be noted that flow of fluid through the valve forces the apertured disc 16 and flexible metal disc 18 away from the aperture 7 and to position to close the recess 13 thus preventing possibility of flow of fluid from the aperture 7 around the discs 16 and 18 into the recess 13 and out through the aperture 14. The aperture 14 also prevents pocketing of fluid in the recess 13 which might interfere with the operation of the device. When the pressure in the aperture or conduit 7 is relieved the discs 18 and 16 are forced back to the position shown in Fig. 1 by the spring 15 and, should a back pressure be built up in the chamber 4 it will be communicated to the chamber 11 through the apertures 19 and to the recess 13 through the aperture 14 thus holding the disc 18 tight against the ground face 20 about the aperture 7 which provides a seat for the flexible metal disc 18. The disc 18 being of very thin metal will bow slightly when under high back pressure into the aperture 7 due to pressure acting through the aperture 17 of the disc 16 as will be understood from Figs. 1 and 2. This slight bowing of the flexible metal disc into the aperture 7 causes the disc to engage the edges of the aperture very tightly and the washer or apertured disc 16 under action by the spring 15 holds the edges of the flexible metal disc 18 in tight engagement with the ground face 20 of the member 6 about the aperture 7. It can thus be seen that the thin flexible metal disc 18 so closely fits about the inlet conduit that there is no possibility of leakage about the discs even when very high pressures are built up and a very light fluid such as gas or air is the medium with which the check valve is used.

From the foregoing description it becomes evident that the device is very simple and efficient in operation, is very positive in action, will not easily get out of order and provides a device which accomplishes the objects described.

Having thus fully described my invention, its utility and mode of operation, what I claim and desire to secure by Letters Patent of the United States is—

1. A check valve comprising a casing open at one end and provided with an outlet opening at the opposite end, a member threaded into the open end of the casing and having an inlet conduit opening therethrough, the said member being provided with an inwardly extending end having a flat ground face through which the inlet conduit opens, a second member threaded onto the inwardly extending end of the first member and providing a chamber therebetween, the said second member being provided with a series of apertures allowing flow from the chamber between the members to the interior of the casing and being provided with a recess in communication with the chamber between the members, a thin metal disc normally engaging the ground face of the first member and closing the inlet conduit, a second disc engaging the first disc and having an aperture in alignment with the inlet conduit engaged by the first disk, and a coiled spring interposed between the second disk and the end of the recess.

2. A check valve comprising an open-ended casing provided with an outlet opening, a member threaded into and closing the open-ended casing and having an inlet conduit therethrough, a second member secured to the first member and providing a chamber therebetween into which the inlet conduit opens, the said second member being provided with a series of apertures allowing communication between the chamber and the casing, a flexible imperforate metal disc normally seating on the end of the first member and closing the inlet conduit, a second disk engaging the thin metal disk and having a central aperture in alignment with the inlet conduit, and a coiled spring normally holding the disc in engagement with its seat.

3. A check valve comprising a casing provided with a cylindrical chamber having an outlet opening, a member threaded into the chamber and provided with an inlet conduit therethrough, a thin flexible imperforate metal disc normally seating on the inner end of the said member and closing the inlet conduit, an apertured disc engaging the first disc on the side opposite the inlet conduit, the aperture thereof being at least as great in diameter as the conduit and in alignment therewith and a coiled spring holding the discs in engagement with the seat.

4. A check valve comprising a casing having a cylindrical chamber provided with an inlet and an outlet conduit, the inlet conduit being provided with a flat ground seat about the inner end thereof within the chamber, a thin flexible imperforate metal disc normally closing the inlet conduit, a second disc engaging the first disc and having a central aperture at least as great in diameter as the inlet conduit and in alignment therewith and a spring yieldably holding the discs on the seat.

In testimony whereof, I sign this specification.

CLARENCE M. HOLLEY